United States Patent
Baker

(10) Patent No.: US 12,450,339 B2
(45) Date of Patent: Oct. 21, 2025

(54) DIVERSITY FOR DETECTION AND CORRECTION OF ADVERSARIAL ATTACKS

(71) Applicant: D5AI LLC, Maitland, FL (US)

(72) Inventor: James K. Baker, Maitland, FL (US)

(73) Assignee: D5AI LLC, Maitland, FL (US)

( * ) Notice: Subject to any disclaimer, the term of this patent is extended or adjusted under 35 U.S.C. 154(b) by 324 days.

(21) Appl. No.: 18/005,916

(22) PCT Filed: Nov. 16, 2021

(86) PCT No.: PCT/US2021/072428
§ 371 (c)(1),
(2) Date: Jan. 18, 2023

(87) PCT Pub. No.: WO2022/115831
PCT Pub. Date: Jun. 2, 2022

(65) Prior Publication Data
US 2023/0289434 A1 Sep. 14, 2023

Related U.S. Application Data

(60) Provisional application No. 63/122,752, filed on Dec. 8, 2020, provisional application No. 63/118,366, filed on Nov. 25, 2020.

(51) Int. Cl.
*G06F 21/55* (2013.01)

(52) U.S. Cl.
CPC .................................. *G06F 21/55* (2013.01)

(58) Field of Classification Search
CPC ....... G06F 21/55; G06F 21/554; G06N 3/045; G06N 3/084
See application file for complete search history.

(56) References Cited

U.S. PATENT DOCUMENTS 11,042,799 B2 * 6/2021 Goswami ............... G06N 20/00
11,783,025 B2 * 10/2023 Molloy .................. G06V 10/82
706/12

(Continued)

FOREIGN PATENT DOCUMENTS

WO 2015018517 A1 2/2015
WO 2019113499 A1 6/2019

(Continued)

OTHER PUBLICATIONS

International Search Report and Written Opinion for corresponding International PCT Application No. PCT/US2021/072428, dated Mar. 16, 2022.

(Continued)

*Primary Examiner* — Farid Homayounmehr
*Assistant Examiner* — Mudasiru K Olaegbe
(74) *Attorney, Agent, or Firm* — K&L Gates LLP

(57) ABSTRACT

A diverse set of neural networks are trained to be individually robust against adversarial attacks and diverse in a manner that decreases the ability of an adversarial example to fool the full diverse set. The systems/methods use a diversity criterion that is specialized for measuring diversity in response to adversarial attacks rather than diversity in the classification results. Also, one or more networks can be trained that are less robust to adversarial attacks to use as a diagnostic to detect the presence of an adversarial attack. Also, node-to-node relation regularization links can be used to train diverse networks that are randomly selected from a family of diverse networks with exponentially many members.

40 Claims, 6 Drawing Sheets

(56) References Cited

U.S. PATENT DOCUMENTS

| | | | |
|---|---|---|---|
| 2015/0082460 A1* | 3/2015 | Amiga | H04L 63/145 |
| | | | 726/28 |
| 2019/0199736 A1* | 6/2019 | Howard | H04L 63/1425 |
| 2019/0220003 A1* | 7/2019 | Sharma | G01C 21/3841 |
| 2020/0143240 A1 | 5/2020 | Baker | |
| 2020/0210842 A1 | 7/2020 | Baker | |
| 2020/0234110 A1* | 7/2020 | Singh | G06N 3/04 |
| 2020/0279165 A1 | 9/2020 | Baker | |
| 2020/0279188 A1 | 9/2020 | Baker et al. | |
| 2020/0285939 A1 | 9/2020 | Baker | |
| 2020/0320371 A1 | 10/2020 | Baker | |
| 2020/0401869 A1 | 12/2020 | Baker et al. | |
| 2020/0410090 A1* | 12/2020 | Baker | G06N 20/20 |
| 2021/0056404 A1* | 2/2021 | Goswami | G06F 18/22 |
| 2021/0287141 A1* | 9/2021 | Molloy | G06F 18/22 |
| 2021/0294893 A1* | 9/2021 | Uddin | G06F 21/554 |
| 2021/0342490 A1* | 11/2021 | Briancon | G06F 21/14 |
| 2022/0335296 A1 | 10/2022 | Baker | |

FOREIGN PATENT DOCUMENTS

| | | |
|---|---|---|
| WO | 2020028036 A1 | 2/2020 |
| WO | 2022115831 A1 | 6/2022 |

OTHER PUBLICATIONS

Dhaliwal et al., Gradient Similarity: An Explainable Approach to Detect Adversarial Attacks against Deep Learning, arXiv:1806.10707v1 [cs.CV], Jun. 27, 2018, pp. 1-11.

Zheng et al., Robust Detection of Adversarial Attacks by Modeling the Intrinsic Properties of Deep Neural Networks, 32nd Conference on Neural Information Processing Systems (NeurIPS 2018), Montreal, Canada; pp. 1-10.

Zhang et al., Comparing and Detecting Adversarial Attacks for Graph Deep Learning, published as a RLGM workshop paper at ICLR 2019; pp. 1-7.

Carrara et al., Detecting adversarial example attacks to deep neural networks, CBMI '17, Jun. 19-21, 2017, Florence, Italy; pp. 1-7.

* cited by examiner

US 12,450,339 B2

DIVERSITY FOR DETECTION AND CORRECTION OF ADVERSARIAL ATTACKS

PRIORITY CLAIM

The present application is a national stage application under 35 U.S.C. § 371 of PCT Application No. PCT/US21/72,428, filed Nov. 16, 2021, which claims priority to both of the following United States provisional application: Ser. No. 63/118,366, filed Nov. 25, 2020; and Ser. No. 63/122,752, filed Dec. 8, 2020, both of which of incorporated herein by reference in their entirety.

BACKGROUND

Deep neural networks have demonstrated excellent performance in classification tasks in recent years, often equaling or exceeding human performance. However, it has also been demonstrated that deep neural network classifiers can be easily fooled by examples created by an adversarial system even with examples that would never fool a human observer.

SUMMARY OF THE INVENTION

In one general aspect, the present invention creates a diverse set of neural networks that are individually robust against adversarial attacks and that are diverse in a manner that decreases the ability of an adversarial example to fool the full diverse set. In one aspect of the invention, the systems and methods of the present invention use a diversity criterion that is specialized for measuring diversity in response to adversarial attacks rather than diversity in the classification results. The invention can also train one or more networks that are less robust to adversarial attacks to use as a diagnostic to detect the presence of an adversarial attack. The invention can use directed node-to-node relation regularization links to train diverse networks that are randomly selected from a family of diverse networks with exponentially many members. These and other benefits realizable through various embodiments of the present invention will be apparent from the description that follows.

DRAWINGS

Various embodiments and aspects of the present invention are described herein by way of example in connection with the following figures.

DESCRIPTION

Figure 1:
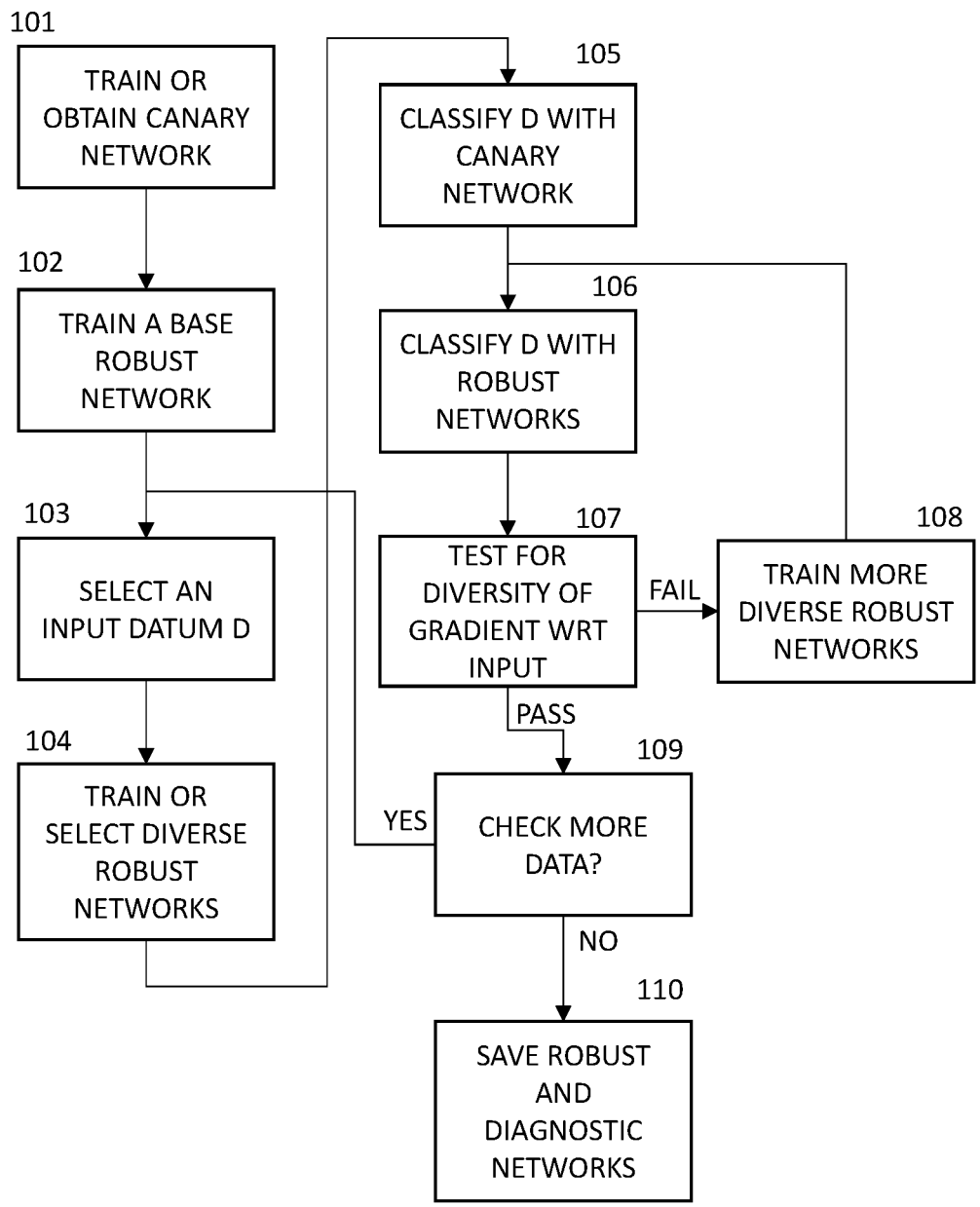
FIG. 1 is a flowchart of an illustrative embodiment of an aspect of the invention in which a computer system trains a diverse set of robust neural networks as a defense against adversarial attack.
Figure 6:
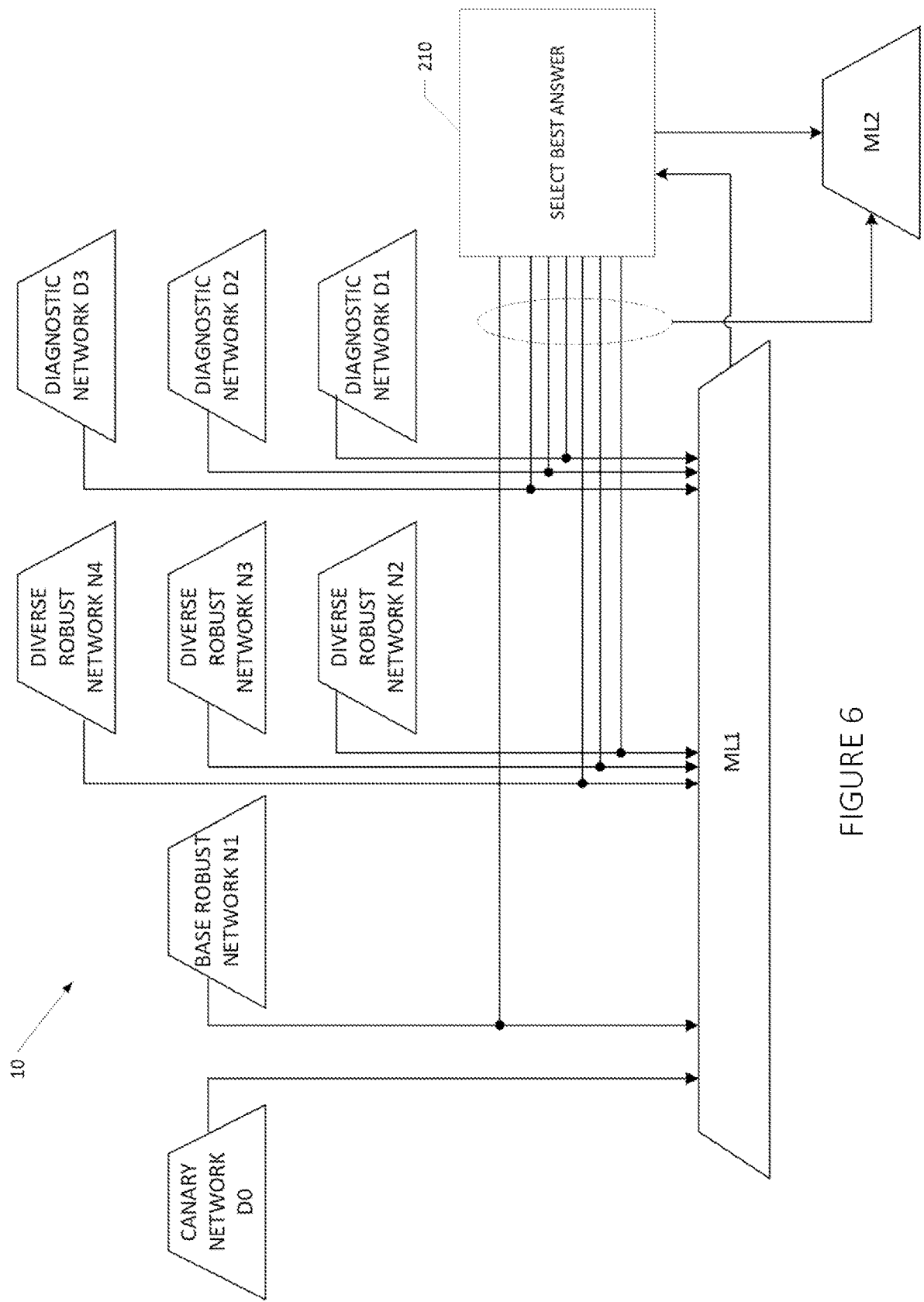
FIG. 6 is a diagram of a machine learning classifier system according to various embodiments of the present invention.

FIG. 1 is a flowchart of an illustrative embodiment of an aspect of the invention in which computer system 400 (see FIG. 4) trains a machine-learning classifier 10 (see FIG. 6), which includes a diverse set of robust neural classifier networks as a defense against adversarial attacks against the classifier. A machine-learning classifier, such as classifier 10 in FIG. 6, is a machine-learning system that assigns an input datum, or determines whether the input data belongs to, a classification category. An adversarial attack on a machine learning classifier is created by modifying a plain image or other pattern to be classified, with the modification designed to cause a classifier to make a misclassification. Various methods for adversarial attacks are well known to those skilled in the art of deep neural network classifiers. An adversarial attack may make a modification so slight that it is not noticed or is easily ignored by a human observer.

In block 101, computer system 400 trains or obtains a non-robust, machine-learning classifier network (e.g., a deep neural network) that computer system 400 may use to detect possible adversarial attacks like a canary detects dangerous gasses in a coal mine. This classifier network is herein called a "canary network." It is also referred to herein sometimes as classifier network D0 as shown in FIG. 6. In some embodiments, computer system 400 may execute the process from block 101 to block 109 multiple times, with a different network for the canary network for each execution of the process. In such embodiments, in FIG. 2, computer system 400 may use the data accumulated from all the canary networks and associated sets of diverse robust and non-robust networks in the detection and correction of an adversarial attack.

In some embodiments, in block 102, computer system 400 trains or obtains a variation on the canary network trained or obtained in block 101. In an illustrative embodiment, computer system 400 trains a base robust network N1 (e.g., a deep neural network) as shown in FIG. 6 to be the variation of the canary network D0. The base robust network N1 is also a classifier trained to determine whether input items belong to the same classification category as the canary network D0. For example, in block 102, computer system 400 may make a copy of the canary network D0 obtained or trained in block 101 and train the copy (e.g., the base robust) network N1 to be more robust against adversarial attacks by adversarial training. As used herein, a first network (e.g., N1 in this case) is more "robust" against adversarial attacks than a second network (e.g., DO in this case) if the first network is less likely than the second network to make a misclassification error on an adversarial attack data item. Adversarial training augments the normal training data by adding data that is created by simulated adversarial attacks. Adversarial training is well known to those skilled in the art of training neural networks to be more robust against adversarial attacks. In some embodiments, computer system 400 may train the base robust network using additional adversarial defenses that are well known to those skilled in the art of training neural networks; for example, computer system 400 may use various techniques for gradient obfuscation.

In a preferred embodiment, computer system 400 does not train the canary network to be robust against adversarial attacks using defense techniques such as adversarial training. However, computer system 400 may train the canary network to have better performance on non-adversarial data by using techniques such as data augmentation by random perturbations other than adversarial attacks.

As mentioned above, in some embodiments, computer system 400 may use a plurality of canary networks. In some embodiments, computer system 400 may jointly train such a plurality of canary networks as an ensemble with better classification performance on non-adversarial data than a single canary network has.

In block 103, computer system 400 selects or creates an input datum D. Datum D may be a training datum or other datum for which the correct label is known, such as a datum obtained from a training datum by data augmentation. Various methods of data augmentation are well known to those skilled in the art of training neural networks, for example, random small perturbations of a training datum. In some embodiments, in block 103, computer system 400 may create or obtain a datum D for which the correct label is not known.

In block 104, computer system 400 trains or selects a set of one or more networks (e.g., a deep neural network) N2, N3, N4, etc., to be diverse from the base robust network N1 and/or diverse from the canary network D0. In some embodiments, computer system 400 may perform the process of blocks 101 to 110 multiple times, continuing to accumulate a growing collection of diverse robust networks and diagnostic networks D1, D2, D3, etc. (see FIG. 6), which diagnostic networks are described further below. The robust diverse networks N2, N3, N4, etc. and the diagnostic networks D1, D2, D3, etc. are also classifiers trained to determine whether input items belong to the same classification category as the canary network D0 (and the base robust network N1). The diverse robust networks N2, N3, N4, etc. created at steps 104 (and/or step 108 and/or step 208 of FIG. 2, described below) and the diagnostic networks D1, D2, etc. may comprise a set S of classifier networks that, collectively, in a deployment setting for the machine-learning classifier, can make a classification for an input datum such that the classification is robust against adversarial attacks. The set S can also include the base robust classifier network N1. In some embodiments, in block 104, computer system 400 may select for the diverse robust network at block 104 some diverse robust networks from the set of diverse robust networks that computer system 400 has previously trained in block 104 or block 108 for other selected input data in previous passes through the loop from block 103 to block 110.

In some embodiments, at block 104 computer system 400 may also train one or more less robust networks (e.g., one or more of the diagnostic networks D1, D2, D3, . . . ) for each robust network N2, N3, etc. Computer system 400 may use these less robust networks in diagnostic tests such as the test in block 107 and the tests in blocks 207, 209, and 211 of FIG. 2 as well as in the selection of the best answer in block 210 of FIG. 2 and FIG. 6. These less robust networks D1, D2, etc. and the canary networks D0 are referred to herein as "diagnostic networks."

Figure 3:
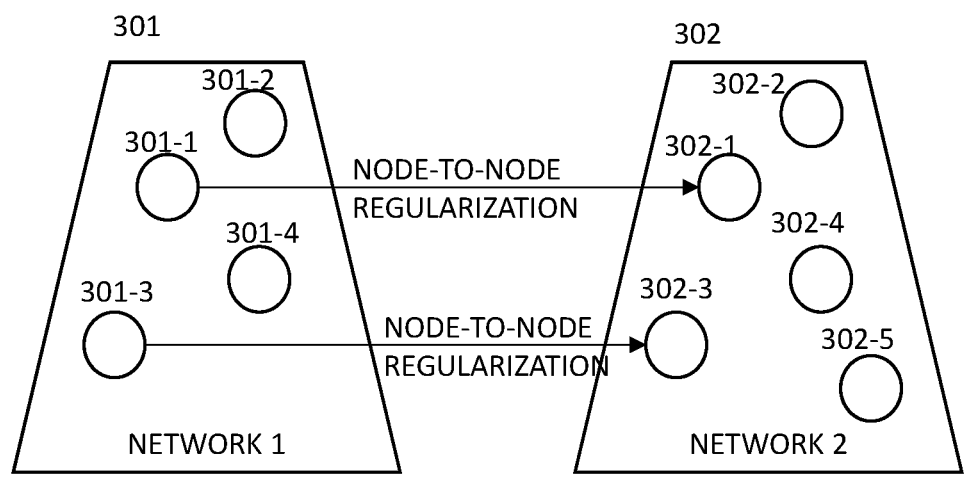
FIG. 3 is a simplified diagram of two neural networks with node-to-node relation regularization links from nodes in the first network to nodes in the second network.

In an illustrative embodiment, computer system 400 may create and train the set of diverse robust networks using node-to-node regularization, as explained in association with FIG. 3. In some embodiments, computer system 400 trains each of these diverse robust networks N2, N3, etc. to be individually robust against adversarial attacks by using techniques such as adversarial training.

In an aspect of the invention, computer system 400 may select from a larger set of candidate networks one or more networks for the set S of diverse, robust networks, that are diverse from the canary network D0 trained or obtained in block 101, using a diversity criterion based on the gradient of an objective function with respect to the vector of input variables, evaluated for one or more selected input data examples.

Computer system 400 may compute the gradient of a specified objective with respect to the input vector of a datum D by using a back-propagation computation without updating the learned parameters. In computing the gradient of the specified objective with respect to the input, computer system 400 extends the back propagation computation that is used for each datum in training a network, computing the gradient of the objective with respect to the input vector as an extra step after doing the back propagation back through each of the hidden layers. The back-propagation computation is well known to those skilled in the art of training neural networks. Extending the back-propagation computation by an extra step to compute a gradient with respect to the input vector for a specified input datum is well known to those skilled in the art of adversarial attack and defense. The gradient of the specified objective with respect to the input vector will herein also be referred to as simply "the input gradient."

For a datum D with a known label, computer system 400 may use as the specified objective the classifier loss function that is used for the back propagation computation in stochastic gradient descent training, which is well known to those skilled in the art of training neural networks. For a datum D for which the label is not known, computer system 400 may back propagate the negative of the gradient of the activation value of the output node that has the highest activation value.

Suppose the networks N1 and N2 are two of the (two or more) robust networks. Based on the training procedure discussed in association with FIG. 3, in blocks 104 and 108 of FIG. 1, computer system 400 may choose a random subset of the set of associated nodes in networks N1 (301 in FIG. 3) and N2 (302 in FIG. 3) on which to impose is-not-equal-to node-to-node regularization links. For example, computer system 400 may add an additional node specific loss to node 302-1 such as $L(x)=\max(0, \beta-\alpha \cdot |act_{301-1}(x)-act_{302-1}(x)|)$, for specified hyperparameters $\alpha$ and $\beta$. The is-not-equal-to regularization is represented by the fact that the node specific loss has its maximum value when the two activations are equal. A typical value for the hyperparameter $\alpha$ is 0.1, but the value of a may be adjusted by the system designer or by computer system 400 by trial and error or from experience on similar tasks.

Node-to-node is-not-equal-to regularization links are explained in association with FIG. 3. Other than the node-to-node regularization, computer system 400 may train each robust network N1, N2, N3, etc. using the well-known procedure of stochastic gradient descent based on gradient estimates that are computed by feed forward computation of node activation values and back propagation computation of the partial derivatives of the classifier loss function with respect to the node activations and the learned parameters, e.g., the connection weights and node biases. The node-to-node regularization of a node is added to the back propagated partial derivative of the loss function as the back propagation computation proceeds backwards through the network.

In some embodiments, computer system 400 may also chose a random subset of the set of training data being used to train network N2 (or networks N3, N4, etc. for additional passes through the loop) as the set of data on which computer system 400 imposes the is-not-equal-to regularization on the selected nodes in network N2. Thus, computer system 400 may randomly select the training scheme to be used in training network N2 from a set of specifications that is literally exponential is the sum of the number of data items in the training set and the number of associated node pairs. In some embodiments, computer system 400 makes a random selection from such a large set to make it difficult for an adversary to guess which networks have been selected.

In block 104, computer system 400 may train one or more diverse robust networks (N2, N3, etc.) at the same time.

In preferred embodiments, in block 104, computer system 400 further trains each of the networks (N2, N3, etc.) in the set of diverse robust networks using adversarial training and/or other methods of adversarial defense.

Figure 2:
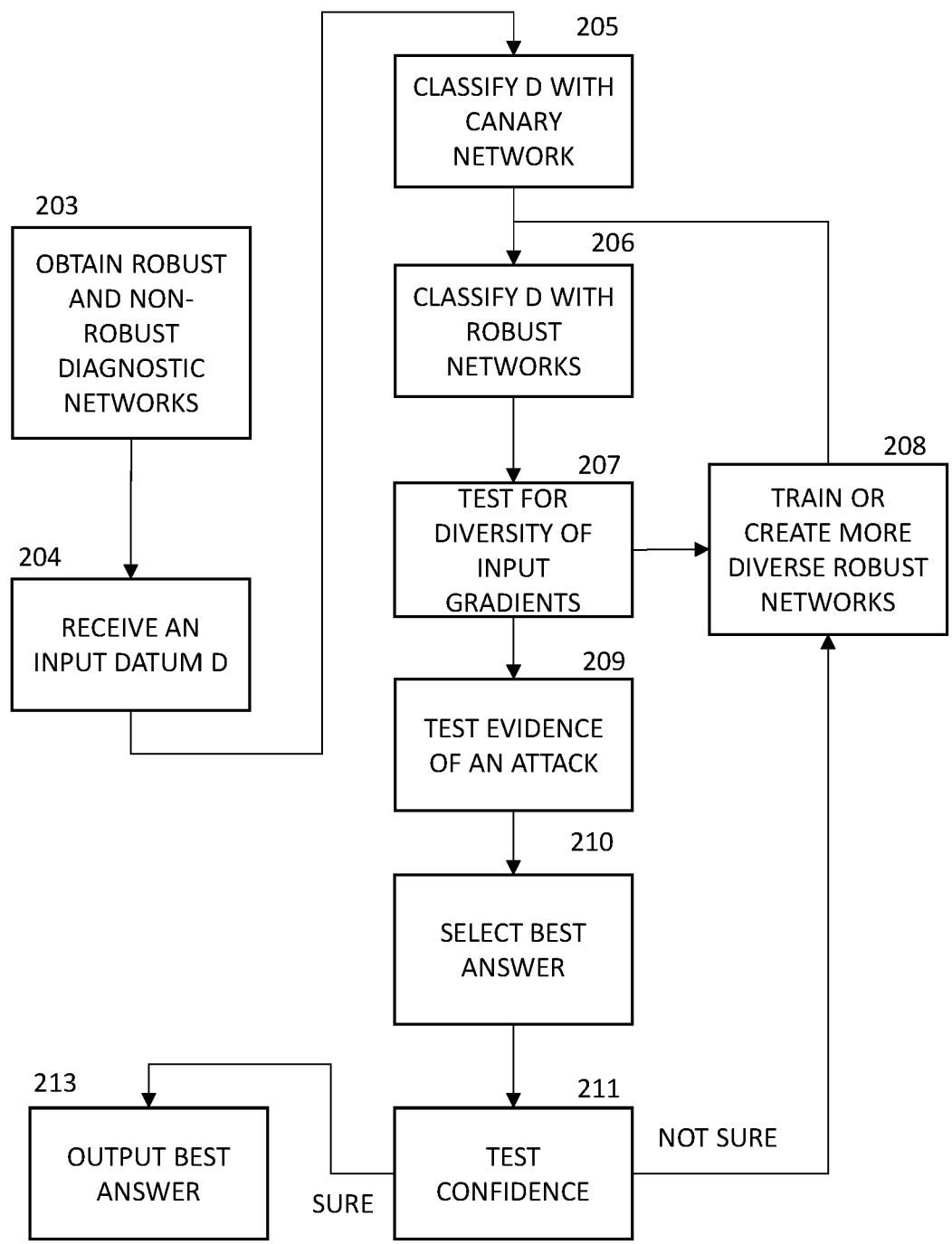
FIG. 2 is a flowchart of an illustrative embodiment of an aspect of the invention in which a computer system receives and classifies an input datum D, in which the input datum D may or may not have been modified by an adversarial attack.

In some embodiments, for each robust network (N1, N2, N3, . . . ), computer system 400 may train additional networks (networks D1, D2, . . . ) with less robustness to provide additional diagnostic information for tests in block 107 and blocks 207, 209 and 211 of FIG. 2.

For example, for each robust network (N1, N2, . . . ), computer system 400 may train one or more networks (D1, D2, . . . ) with fewer adversarial training examples than the robust network, or computer system 400, in the adversarial training, may use simulated adversarial attacks on only a subset of the training data. In some embodiments, computer system 400 may use these less robust networks D1, D2, etc., in addition to the canary network D0, as information for detecting and diagnosing adversarial attacks.

As another example of more and less robust networks, computer system 400 may make the robust networks N1, N2, etc., more robust by obfuscating the gradient by quantizing some or all of the input variables and may train one or more less robust networks by quantizing fewer or none of the input variables.

As another example, computer system 400 may train one or more less robust networks D1. D2, etc., by smoothing the activation functions of some of the nodes in a corresponding robust network N1, N2, etc.

In block 105, computer system 400 performs a feed forward activation computation to classify the selected datum D using the canary network D0. Computer system 400 saves this classification result and, optionally, additional information from this computation to use in the adversarial attack detector (block 209 of FIG. 2) and the selection of the best answer (210 of FIG. 2), and in the diagnostic tests in blocks 207, 209 and 211 of FIG. 2.

In block 106, computer system 400 classifies datum D with the robust networks N1, N2, etc., trained in blocks 102 and 104.

In block 107, for the base robust network N1 and for one or more of the diverse robust networks N2, N3, etc., computer system 400 computes the input gradient, i.e., the gradient of the error loss function with respect to the input variables/vector, evaluated for the input datum D. Then, for each of the one or more diverse robust networks N2, N3, etc., for one or more canary networks D0 and/or one or more base robust networks N1, computer system 400 computes the correlation of the input gradient for the robust diverse network (e.g., N2, N3, etc.) trained or selected at block 104 with the input gradient the base robust network N1 and/or the canary network D0.

Computer system 400 then, still at block 107, tests the computed correlation based on a specified criterion for diversity. The criterion should be a way to identify input gradients that have a low correlation, such that the input gradients are more diverse. For example, computer system 400 may compute the correlation (e.g., cosine of the angle between two vectors) of the input gradient of network N2 (or N3, N4, etc., for later passes through the loop of FIG. 1) with the input gradient of network N1. Computer system 400 may then accept network N2 (or N3, N4, etc. for later passes through the loop of FIG. 1) for inclusion in the set as being sufficiently diverse from network N1 only if the correlation of the input gradient vectors is less than a value specified by a hyperparameter.

If the criterion for diversity is not met for at least a specified number of diverse networks, the network trained or selected at step 104 is not included in the set and computer system 400 proceeds to block 108. Otherwise computer system 400 proceeds to block 109.

In block 108, computer system 400 trains additional diverse robust networks as described in association with block 104. Block 108 is similar to block 104, except that after block 108 the process returns to block 106, thereby skipping block 105 where the canary network classifies the input datum. In some embodiments, computer system 400 may also train one or more less robust networks for each robust network. Computer system 400 may use these less robust networks in diagnostic tests such as the tests in blocks 207, 209, 211 of FIG. 2 as well as in the selection of the best answer in block 210 of FIG. 2.

In block 109, computer system 400 checks a criterion to determine if the computation loop from block 103 to block 107 has been done for enough distinct selections of a datum D in block 103. If the criterion (as described further below) is not satisfied, the process returns to block 103 where a new input datum is selected and blocks 104 to 107 are repeated.

The end purpose of the computations from block 103 to 109 is to train a sufficient set of diverse robust networks N2, N3, etc., so that, for a new datum D2 that is as yet unknown, there is likely to be one or more diverse robust network in the set of diverse robust networks with an input gradient that is diverse from the input gradient of the canary network D0 and/or the base robust network N1 for new datum D2.

In block 109, computer system 400 may accumulate a statistic to estimate the probability, for new data, that the test of diversity in block 107 may be met without any additional diverse networks N2, N3, etc., being trained in block 104 or block 108. Computer system 400 may accumulate this statistic and then return to block 103 until the stopping criterion for block 109 is met. Computer system 400 may, for example, use the stopping criterion that the estimated probability be greater than a specified value with a specified degree of confidence.

In block 110, computer system 400 saves the two or more diverse robust networks N1, N2, etc., and the one or more diagnostic networks D1, D2, etc., optionally along with the base robust network N1, to be used by the process illustrated in FIG. 2. In some embodiments, computer system 400 may also use these networks for training diagnostic tests that computer system 400 may use as pretrained diagnostic tests in other classification tasks.

FIG. 2 is a flowchart of an illustrative embodiment of an aspect of the invention in which computer system 400 receives and classifies an input datum D, in which the input datum D may or may not have been modified by an adversarial attack. The process illustrated in FIG. 2 can be used for deployment of the machine learning classifier, with the set of diverse robust classifier networks N2, N3, etc. and the one or more diagnostic classifier networks D1, D2, etc., generated according to the process shown in FIG. 1. The machine learning classifier can also comprise the base robust network N1. As such, the computer-implemented machine learning classifier implementing the process of FIG. 2 may include, as part of the set S, two or more robust networks N2, N3, etc., the base robust network N1, and the one or more diagnostic networks D1, D2, etc. to make the classifications and to help identify an adversarial attack. The process of FIG. 2 may also include further training of the diverse and/or diagnostic networks and/or creation of more diverse and/or diagnostic networks as explained below.

In block 203, computer system 400 obtains a set of networks comprising, one or more canary networks, a set of diverse robust networks, and, optionally, a set of less robust diagnostic networks. For example, computer system 400 may obtain the set of networks saved by computer system 400 in block 110 of FIG. 1. In some embodiments, computer system 400 may train diagnostic tests that are not specific to a single classification task. In some embodiments, in block 201, computer system 400 may obtain robust and diagnostic networks trained in a different classification task.

In block 204, computer system 400 receives an input datum D. In operational use, the datum D is received from an external source, and computer system 400 does not know whether the received datum D is a regular, unmodified input datum or the datum D is the result of a regular datum being modified by an adversarial attack. During training and development, the received input datum may be an unmodified datum or may be a datum modified by a simulated adversarial attack.

In block 205, computer system 400 classifies datum D using one or more of the canary networks D0 trained in block 101 of FIG. 1.

In block 206, computer system 400 classifies the datum D using a selected set of the base robust network N1 and the diverse robust networks N2, N3, etc. In some embodiments, the selected set of networks may comprise all the robust networks (N1, N2, etc.) trained in blocks 102, 104 and 108 of FIG. 1. In other embodiments, the robust networks used to classify the datum D is less than all of the robust networks. For example, if following step 110 of FIG. 1, there are five robust networks (N1, N2, N3, N4, N5), at block 206 less than all five (e.g., four of them, e.g., N1 to N4) can be used to classify the datum D.

In block 207, computer system 400 tests each of the selected diverse robust networks (e.g., N2, N3, N4) against a criterion, using a test such as described in association with block 107 of FIG. 1. For example, computer system 400 may compute the correlation of the input gradient of each of the selected diverse robust networks N2, N3, etc., with the input gradient of a canary network D0 and/or the input gradient of a base robust network N1, evaluated for the datum received in block 204.

In some embodiments, computer system 400 also computes the pairwise correlations of the selected diverse robust networks with each other. Computer system 400 then checks the number of diverse robust networks N2, N3, etc., that have input gradient correlations with the canary network D0 and/or the base robust network N1 and with each other. Computer system 400 may then count the number of diverse robust networks N2, N3, etc., that satisfy a specified diversity criterion. Computer system may compare this number with a value specified by the system designer. If the number of diverse robust networks that satisfy the specified diversity criterion is equal to or greater than the specified value, then computer system 400 proceeds to block 209. Otherwise, computer system proceeds to block 208.

In block 208, computer system 400 may train additional robust diverse networks, with diversity computed for the input gradients evaluated for the datum D received at step 204. In block 208, computer system 400 may train the robust diverse networks as in blocks 104 and 108 of FIG. 1. However, in the aspect of the invention illustrated in FIG. 2, datum D is always the datum received in block 204, not a datum selected by computer system 400. The received datum D does not change during process from block 204 to block 210.

In some embodiments, in block 208, computer system 400 may create additional robust diverse networks from a base robust network N1 without additional training. For example, computer system 400 may use a process of probability weighted dropout. In an illustrative embodiment, computer system 400 may select a set of nodes, such as all the nodes in a layer of a layered neural network. Then computer system 400 may set a retention probability ProbRetain(n) for each node n in the selected set of nodes. Finally, in a feed forward activation computation of the network N1, for each node in the selected set of nodes, computer system may intervene in the feedforward computation of node n by setting the activation of node n to 0.0 with probability 1.0 minus ProbRetain(n). In some embodiments, computer system may scale up each of the activations of the retained nodes. For example, computer system may scale up all the activations in a layer to make the sum of the absolute value of the activations in a layer be the same after some activations have been set to 0.0 as the sum was before the change in the activations. In some embodiments, computer system 400 may use other scaling schemes, which may be controlled by one or more hyperparameters set by the system designer.

In some embodiments, computer system 400 does no additional training after creating a new robust diverse network. In some embodiments, however, computer system 400 may do additional training of any robust diverse network created in block 208. In some embodiments, computer system 400 may treat the scale-up parameter for a retained node as a learned parameter and may train the scale-up parameter with additional training.

In block 209, computer system 400 classifies datum D using the robust networks N1, N2, N3, etc., created according to FIG. 1 and/or step 208 and the diagnostic networks, including the canary networks D0 and the less robust diverse networks D1, D2, . . . , created according to FIG. 1.

Computer system 400 has trained the canary network(s) D0 and the less robust diverse networks D1, D2, etc. to be more vulnerable to adversarial attacks than the robust networks N1, N2, N3. That means that these diagnostic networks D1, D2, etc. are more likely to make a misclassification of a datum D that has been modified by an adversarial attack than are the more robust networks D1, D2, etc. In block 209, computer system 400 uses this tendency as a diagnostic tool to detect an adversarial attack.

In some embodiments, computer system 400 may check the agreement between the best scoring classification category for a diverse robust network (e.g., N2) and the best scoring classification category for the associated canary network D0 and any associated less robust networks D2, D3, etc. In addition, computer system 400 may perform this check for a plurality of diverse robust networks (e.g., N3) as well as comparing the best scoring classification categories among the diverse robust networks (N2, N3, etc.). Computer system 400 may then determine that datum D has been modified by an adversarial attack if there is a systematic difference between the classifications of less robust networks D0, D1. etc. and the classifications of the more robust networks N1, N2, etc.

In some embodiments, computer system 400 may make the determination of an adversarial attack based on rules and/or hyperparameters specified by the system designer.

In some embodiments, computer system 400 may train a machine learning system ML1 (see FIG. 6) to discriminate between data that have been modified by an adversarial attack from data that has not been modified. Computer system 400 may use the classification answers and output activations of the less robust and more robust networks as input data to the machine learning system ML1 that discriminates data that has been attacked from data has not. Computer system 400 may generate training data for this attack detection machine system ML1 by using data that has been set aside from the data used for training the classifiers in FIG. 1. Computer system 400 may create examples of unmodified and modified data by using simulated adversarial attacks. The attack detection machine learning system ML1 does not need to be a neural network. It may be any form of machine learning system.

In block 210, computer system 400 selects the best classification category based on the classifications by the robust classifier networks N1, N2, N3, etc. and less robust networks D1, D2, etc., in light of the evidence of an adversarial attack estimated in block 209 by ML1.

In one illustrative embodiment, computer system 400 may treat the set of robust networks N1, N2, N3, etc. as an ensemble and make a classification based on an ensemble combining rule, such as an arithmetic or geometric average of the classifications or plurality voting.

In other embodiments, computer system 400 may treat the set of robust networks N1, N2, N3, etc. as an ensemble only when the test in block 209 by ML1 indicates that datum D has probably not been modified. If the test in block 209 indicates that datum D has probably been modified, computer system 400 may randomly choose a subset of the set of robust networks N1, N2, N3, etc. to use as an ensemble in order to make it harder for a potential attacker to guess which of the robust diverse networks will be used.

In some embodiments, if the test in block 209 indicates that datum D has been modified and that the classification by the canary network D0 and/or some of less robust networks D1, D2, etc., has been changed, then computer system 400 may restrict the ensemble of diverse, robust networks D2, D3, . . . , from selecting the same classification as the canary network and less robust networks.

In block 211, computer system 400 makes a confidence estimate of the classification answer selected in block 210. For example, if the classifications of the set of diverse robust networks have more than a specified degree of disagreement, then computer system 400 may determine that the confidence of the best answer is too low.

In some embodiments, computer system 400 may train a machine learning system ML2 to estimate the probability that the answer selected in block 210 is correct or to estimate some other measure of confidence. Computer system 400 may train this confidence estimation machine learning system ML2 using the pattern of agreements and disagreements among the total set of diverse robust networks and diagnostic networks. Computer system 400 may train the confidence estimation machine learning system ML2 using data set aside from the data used to train the networks, with and without modifying the data by simulated adversarial attacks.

In some embodiments, if the confidence estimated by confidence estimation machine learning system ML2 in block 211 is less than a specified value, then computer system 400 proceeds to block 208 to train additional diverse robust networks.

If the confidence estimated by confidence estimation machine learning system ML2 in block 211 is equal to or greater than a specified value, computer system 400 proceeds to block 213.

In block 213, computer system 400 outputs the best classification answer selected in block 210, optionally with the confidence score determined at block 211.

FIG. 3 is a simplified diagram of two neural networks with node-to-node relation regularization links from nodes in the first network 301 to nodes in the second network 302. In an illustrative embodiment of an aspect of the invention, computer system 400 may train the second network 302 to be diverse from the first network 301 by imposing, during training of the second network, the regularization represented by the node-to-node relation regularization. In the example, illustrated in FIG. 3, the relation for each node-to-node relation regularization link is an "is-not-equal-to" relation, such as described herein.

Computer system 400 may train a network 302 to be diverse from a network 301 as illustrated in FIG. 3. In an illustrative embodiment, network 301 may be a canary network D0 or a base robust network N1. Network 302 may be a robust network N2 trained by computer system 400 in block 104 or block 108 of FIG. 1 or block 208 of FIG. 2. In an illustrative embodiment, a subset of the nodes of network 301 is in one-to-one correspondence with a subset of the nodes in network 302. For example, the architecture of network 302 may be identical to the architecture of network 301, with each node in 301 associated with the node in the same position in network 302. As another example, the nodes of 302 may be a superset or a subset of the nodes in 301 with each node in the intersection of the two sets being associated with the corresponding node in the other network. In some embodiments of some applications, computer system 400 or a system designer may determine corresponding nodes by a semantic relationship, such as nodes that detect a specific feature or that detect a specific part in a mereology. Nodes associated by such a semantic relationship do not need to be in similar positions in their respective networks.

In FIG. 3, corresponding nodes are indicated by having the same value for the number after the hyphen. Thus, node 301-1 in network 301 corresponds to node 302-1 in network 302, node 301-2 in network 301 corresponds to node 302-2 in network 302, and so on. Note that, in FIG. 3, there is no node in network 301 that corresponds to node 302-5 in network 302, illustrative of the fact that the set of nodes in network 302 does not need to be the same as the set of nodes in network 301.

In the illustrated embodiment, network 301 has been pretrained and computer system 400 is training network 302 with a node-to-node regularization imposed by a link from node 301-1 to node 302-1 in addition to the main objective of minimizing the classifier error loss function. The word "link" is used to denote a directed association from the source node (such as 301-1 or 301-3) of a node-to-node relation regularization to the destination or regularized node (such as 302-1 or 302-3). Note that a "link" is not a network connection and the link does not imply propagation of activations from the source node to the destination node nor back propagation of partial derivative estimates from the destination node back to the source node.

In the embodiment illustrated in FIG. 3, the source nodes, such as 301-1 and 301-3 are in network 301 and the destination nodes, such as 302-1 and 302-3 are in network 302 and there are no connections (i.e., propagation of weighted activations) between network 301 and network 302. In general, node-to-node relation regularization links impose additional regularizations without adding network connections or additional weights or other learned parameters. Thus, node-to-node relation regularization links may be added to nodes within a network or between networks without creating an excess of learned parameters. For example, in some embodiments, there may be additional node-to-node relation regularization links within network 301 or network 302 for additional regularization.

In some embodiments, computer system 400 may train two or more networks at the same time with node-to-node regularization links among the networks being trained as well as from the base network to each of the networks being trained.

The node-to-node regularization for training diverse networks is a special case of the data-dependent node-to-node knowledge sharing regularization discussed in PCT patent application PCT/US20/27912, filed Apr. 13, 2020, and titled "Data-Dependent Node-to-Node Knowledge Sharing by Regularization in Deep Learning," which is incorporated in herein by reference in its entirety. In this special case, computer system 400 regularizes a data-dependent relationship for the activation of a node such as 302-1 in network 302 to not be equal to the activation of the associated node 301-2 in network 301 for any datum x is a specified set of data.

By way of illustration, computer system 400 may enforce the is-not-equal-to relationship by adding a node specific loss function to the back propagation of the classifier error loss function during training of network 302. For example, computer system 400 may add an additional node specific loss to node 302-1 such as $L(x)=\max(0, \beta-\alpha \cdot |act_{301-1}(x) - act_{302-1}(x)|)$, for specified hyperparameters $\alpha$ and $\beta$. The is-not-equal-to regularization is represented by the fact that the node specific loss has its maximum value when the two activations are equal. A typical value for the hyperparameter $\alpha$ is 0.1, but the value of a may be adjusted by the system designer or by computer system 400 by trial and error or from experience on similar tasks.

Figure 4:
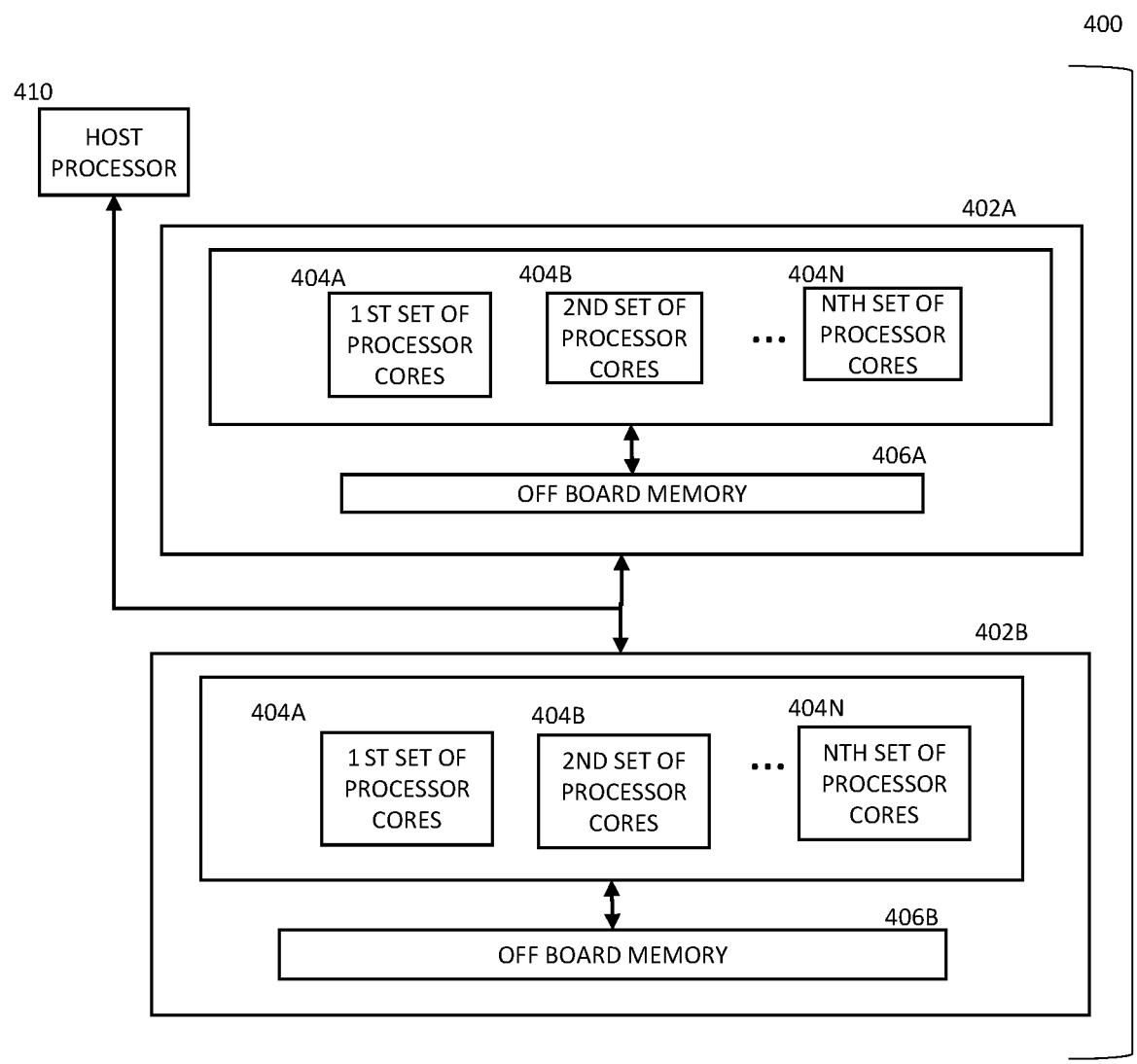
FIG. 4 is a diagram of a computer system that could be used to implement various embodiments of the invention.

FIG. 4 is a diagram of a computer system 400 that could be used to implement the embodiments described above. The illustrated computer system 400 comprises multiple processor units 402A-B that each comprises, in the illustrated embodiment, multiple (N) sets of processor cores 404A-N. Each processor unit 402A-B may comprise on-board memory (ROM or RAM) (not shown) and off-board memory 406A-B. The on-board memory may comprise primary, volatile and/or non-volatile storage (e.g., storage directly accessible by the processor cores 404A-N). The off-board memory 406A-B may comprise secondary, non-volatile storage (e.g., storage that is not directly accessible by the processor cores 404A-N), such as ROM, HDDs, SSD, flash, etc. The processor cores 404A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 410 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 404 may train and/or implement different networks or subnetworks or components. For example, in one embodiment, the cores of the first processor unit 402A may implement a canary network and the second processor unit 402B may implement a diverse robust network. As another example, with reference to FIG. 3, the cores of the first processor unit 402A may implement the training of one of a set of diverse neural networks being trained at the same time, the cores of the second processing unit 402B may implement the training of a second diverse neural network, the cores of yet another processing unit (now shown) may implement a machine learning system to detect adversarial attacks as in block 209 of FIG. 2, and the cores of yet another processing unit may implement the selection of the best classification category as in block 210 of FIG. 2. One or more host processors 410 may coordinate and control the processor units 402A-B.

In other embodiments, the system 400 could be implemented with one processor unit 402. In embodiments where there are multiple processor units, the processor units could be co-located or distributed. For example, the processor units 402 may be interconnected by data networks, such as a LAN, WAN, the Internet. etc., using suitable wired and/or wireless data communication links. Data may be shared between the various processing units 402 using suitable data links, such as data buses (preferably high-speed data buses) or network links (e.g., Ethernet).

The software for the various computer system 400s described herein and other computer functions described herein may be implemented in computer software using any suitable computer programming language such as .NET, C. C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM. MIPS, and x86; examples of high level languages include Ada, BASIC, C, C++, C #, COBOL, Fortran, Java, Lisp, Pascal, Object Pascal, Haskell. ML; and examples of scripting languages include Bourne script, JavaScript, Python, Ruby, Lua, PHP, and Perl.

Figure 5:
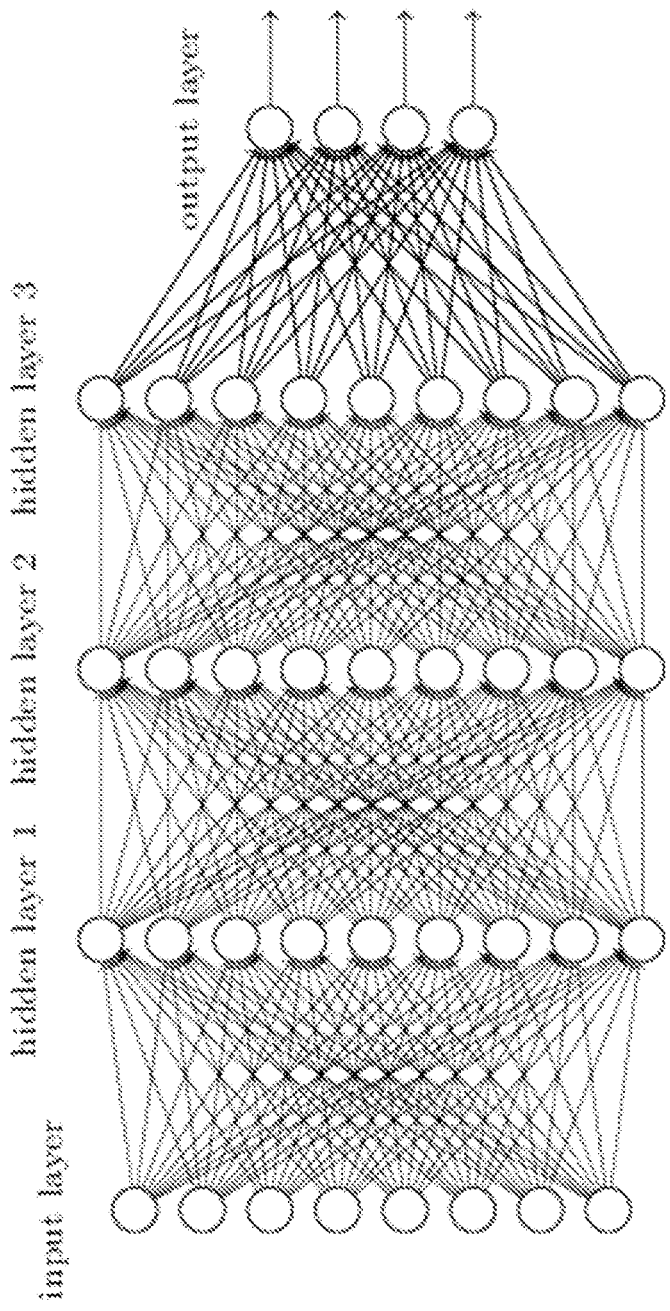
FIG. 5 is a drawing of an example of a multi-layer feed-forward deep neural network.

FIG. 5 is a drawing of an example of a multi-layer feed-forward deep neural network. Many components of the current invention are neural networks, such as the diverse robust networks, the canary networks, and the other diagnostic networks. A neural network is a collection of nodes and directed arcs. The nodes in a neural network are often organized into layers. In a feed-forward neural network, the layers may be numbered from bottom to top, when diagramed as in FIG. 5. In other publications, the layers may be numbered from top to bottom or from left to right. No matter how the figure is drawn, feed forward activation computations proceed from lower numbered layers to higher number layers and the back-propagation computation proceeds from the highest numbered layers to the lower numbered layers. Each directed arc in a layered feed-forward neural network goes from a source node in a lower numbered layer to a destination node in a higher numbered layer. The feed-forward neural network shown in FIG. 5 has an input layer, an output layer, and three inner layers. An inner layer in a neural network is also called a "hidden" layer. Each directed arc is associated with a numerical value called its "weight." Typically, each node other than an input node is associated with a numerical value called its "bias." The weights and biases of a neural network are called "learned" parameters. During training, the values of the learned parameters are adjusted by the computer system 400 shown in FIG. 4. Other parameters that control the training process are called hyperparameters.

The invention applies to other forms of neural network classifiers such as convolutional neural networks (CNNs), recurrent neural networks (RNNs), and transformer networks.

A feed-forward neural network may be trained by the computer system 400 using an iterative process of stochastic gradient descent with one iterative update of the learned parameters for each minibatch. The full batch of training data is typically arranged into a set of smaller, disjoint sets called minibatches. An epoch comprises the computer system 400 doing a stochastic gradient descent update for each minibatch contained in the full batch of training data. For each minibatch, the computer estimates the gradient of the objective for a training data item by first computing the activation of each node in the network using a feed-forward activation computation. The computer system 400 then estimates the partial derivatives of the objective with respect to the learned parameters using a process called "backpropagation," which computes the partial derivatives based on the chain rule of calculus, proceeding backwards through the layers of the network. The processes of stochastic gradient descent, feed-forward computation, and backpropagation are well-known to those skilled in the art of training neural networks.

In one general aspect, therefore, the present invention is directed to a computer system that comprises one or more processor cores and a memory. The memory stores computer instructions that, when executed by the one or more processor cores, cause the one or more processor cores to implement a classifier that classifies whether input items should be assigned to a classification category and that is trained through machine learning, to be robust against adversarial attacks. The classifier comprises a plurality of classifier networks, where each of the classifier networks comprises a neural network. The plurality of classifier networks comprise: (i) a first set of two or more robust diverse classifier networks, where each of the two or more robust diverse classifier networks are trained through machine learning to classify whether input items should be assigned to the classification category; and (ii) a second set of one or more diagnostic classifier networks, where each of the one or more diagnostic classifier networks is trained through machine learning to classify whether input items should be assigned to the classification category, and where the one or more diagnostic classifier networks are less robust to adversarial attacks that the two or more robust diverse classifier networks. The memory stores instructions, that when executed by the one or more processor cores, cause the one or more processor cores to determine, in a deployment of the classifier, whether an input datum should be assigned to the classification category by: (a) detecting, based on at least classifications by the two or more robust diverse networks and the one or more diagnostic classifier networks for the input datum, whether the input datum is an adversarial attack; and (b) determining, based on at least the classifications by the two or more robust diverse networks for the input datum and based on detection of whether the input datum is an adversarial attack, whether the input datum should be assigned to the classification category.

In various implementations, the memory stores instructions, that when executed by the one or more processor cores, cause the one or more processor cores to implement an attack detection system that is trained, through machine learning, to detect whether the input datum is an adversarial attack, such as based on, at least, classifications by the one or more diagnostic classifier networks of the input datum. Additionally, the memory further stores instructions, that when executed by the one or more processor cores, cause the one or more processor cores to detect whether the input datum is an adversarial attack based on a degree of agreement between the classifications by the two or more robust diverse classifier networks and the one or more diagnostic classifier networks, wherein in a lesser degree of agreements is indicative of an adversarial attack. The attack detection system can comprise a neural network.

In various implementations, the memory stores instructions, that when executed by the one or more processor cores, cause the one or more processor cores to determine whether the input datum should be assigned to the classification category by: treating the two or more robust diverse networks as part of an ensemble; and applying an ensemble combining rule to outputs of the two or more robust diverse networks to determine whether the input datum should be assigned to the classification category.

In various implementations, the memory stores instructions, that when executed by the one or more processor cores, cause the one or more processor cores to compute a confidence score for the determination of whether the input datum should be assigned to the classification category based on at least the classifications by the two or more robust diverse networks for the input datum. A confidence estimation machine learning system, which is trained through machine learning, can compute the confidence score for the determination of whether the input datum should be assigned to the classification category. The memory may further store instructions, that when executed by the one or more processor cores, cause the one or more processor cores to train an additional robust diverse classifier network upon a determination that the confidence score is less than a specified value.

In various implementations, the memory stores instructions, that when executed by the one or more processor cores, cause the one or more processor cores to generate the first set of two or more robust diverse classifier networks by: training, through machine learning, a base robust classifier network to classify whether input data items should be assigned to the classification category, where the base robust classifier network is trained to be more robust to an adversarial attack than an initial classifier network that is trained to classify whether input data items should be assigned to the classification category: and selecting the two or more robust diverse classifier networks to be included in the first set, where the two or more robust diverse classifier networks are trained to be diverse from at least the base robust classifier network, and where the two or more robust diverse classifier networks are selected for inclusion in the first set based on a diversity criterion.

In various implementations, the memory further stores instructions, that when executed by the one or more processor cores, cause the one or more processor cores to train the base robust classifier network to be more robust to an adversarial attack that the initial classifier network by training the base robust classifier network to be less likely to make a misclassification error than the initial classifier network on an adversarial attack data item. The initial classifier network can comprise an ensemble.

In various implementations, the classifier networks of the classifier further comprises the base robust classifier network. In that connection, a classification by the base robust classifier for the input datum can be used to: determine whether the input datum is an adversarial attack; and determine whether the input datum should be assigned to the classification category.

In various implementations, the memory stores instructions, that when executed by the one or more processor cores, cause the one or more processor cores to select the two or more robust diverse classifier networks to be included in the first set by, iteratively, for a number of n=1, ..., N iterations, where N is greater than or equal to two, until a stopping criterion is met: training a nth classifier network to be diverse from the base robust classifier network; classifying, by each of the robust diverse classifier in the first set, if any, by the base robust classifier network, and by the nth classifier network, a nth training datum; computing input gradients for each of the robust diverse classifier networks in the first set, if any, for the base robust classifier network, and for the nth classifier network, for the nth training datum; computing a correlation between the input gradient for the nth classifier network for the nth training datum and the input gradient for the based robust classifier network, and computing correlations between the input gradient for the nth classifier network for the nth training datum and respectively the input gradients for each of the robust diverse classifier networks in the first set, if any, for the nth training datum: and adding the nth classifier network as a robust diverse classifier network to the first set upon a determination, based on the computed correlations, that the nth classifier network is sufficiently diverse from an applicable threshold number of the robust diverse classifier networks, if any, in the first set.

In various implementations, the memory stores instructions, that when executed by the one or more processor cores, cause the one or more processor cores to train the nth classifier network to be diverse from the base robust classifier network by imposing an is-not-equal-to-node-to-node regularization link between the base robust classifier network and the nth classifier network.

In various implementations, the memory stores instructions, that when executed by the one or more processor cores, cause the one or more processor cores to determine whether the nth classifier network is sufficiently diverse from the threshold number of diverse classifier networks, if any, in the first set by determining whether at least a quantity of the computed correlations that is equal to or less than a threshold correlation value is equal to or greater than a threshold quantity.

In various implementations, the memory stores instructions, that when executed by the one or more processor cores, cause the one or more processor cores to, upon a determination that the nth classifier network is not sufficiently diverse from the applicable threshold number of the robust diverse classifier networks: train an additional nth classifier network to be diverse from the base robust classifier network; classifying, by the nth additional classifier network, the nth training datum: computing an input gradient for the additional nth classifier network, for the nth training datum; computing a correlation between the input gradient for the additional nth classifier network for the nth training datum and the input gradient for the based robust classifier network, and computing correlations between the input gradient for the additional nth classifier network for the nth training datum and respectively the input gradients for each of the robust diverse classifier networks in the first set, if any, for the nth training datum: and adding the additional nth classifier network as a robust diverse classifier network to the first set upon a determination, based on the computed correlations, that the additional nth classifier network is sufficiently diverse from the applicable threshold number of the robust diverse classifier networks, if any, in the first set.

In various implementations, the stopping criterion is a determination, by the computer system, that a likelihood that, for a non-training datum, at least one of the robust diverse classifier networks in the first set is sufficiently diverse from the base robust classifier network and/or the initial classifier network, is greater than a specified diversity likelihood value.

In various implementations, the memory stores instructions, that when executed by the one or more processor cores, cause the one or more processor cores to, for each iteration where a robust diverse classifier network is added to the first set: update a metric indicative of the likelihood that, for a non-training datum, at least one of the robust diverse classifier networks in the first set is sufficiently diverse from the base robust classifier network and/or the initial classifier network; and compare the metric to the specified diversity likelihood value, wherein the stopping criteria is met if the metric is greater than the specified diversity likelihood value.

In various implementations, the memory stores instructions, that when executed by the one or more processor cores, cause the one or more processor cores to train the one or more diagnostic classifier networks of the second set.

In various implementations, the memory stores instructions, that when executed by the one or more processor cores, cause the one or more processor cores to train the one or more diagnostic classifier networks of the second set by, for each robust diverse network in the first set, train one or more corresponding diagnostic classifier networks. where each robust diverse network is more robust to adversarial attacks than the one or more corresponding diagnostic classifier networks.

In another general aspect, the present invention includes a method that includes the step of training, with a computer system that comprises one or more processor cores and a memory that stores computer instructions executed by the one or more processor cores, through machine learning, a classifier that classifies whether input items should be assigned to a classification category and that is robust against adversarial attacks, where training the classifier comprises a plurality of classifier networks, and where each of the classifier networks comprises a neural network. Training the plurality of machine-learning classifiers comprises: training a first set of two or more robust diverse classifier networks, where each of the two or more robust diverse classifier networks are trained through machine learning to classify whether input items should be assigned to the classification category: and training a second set of one or more diagnostic classifier networks, where each of the one or more diagnostic classifier networks is trained through machine learning to classify whether input items should be assigned to the classification category, and where the one or more diagnostic classifier networks are less robust to adversarial attacks that the two or more robust diverse classifier networks. The method may further comprise the step of deploying, by the computer, the classifier post-training to classify whether an input datum should be assigned to the classification category. Deploying the classifier can comprises: detecting, based on at least classifications by the two or more robust diverse networks and the one or more diagnostic classifier networks for the input datum, whether the input datum is an adversarial attack; and determining, based on at least the classifications by the two or more robust diverse networks for the input datum and based on detection of whether the input datum is an adversarial attack, whether the input datum should be assigned to the classification category.

In various implementations, the method further comprises training, by the computer system, through machine learning, an attack detection system to detect whether the input datum is an adversarial attack: and deploying the classifier further comprises detecting, by the attack detection system, whether the input datum is an adversarial attack.

In various implementations, detecting whether the input datum is an adversarial attack comprises detecting, by the attack detection system, whether the input datum is an adversarial attack based on, at least, classifications by the one or more diagnostic classifier networks of the input datum.

In various implementations, detecting whether the input datum is an adversarial attack comprises detecting, by the attack detection system, whether the input datum is an adversarial attack based on a degree of agreement between the classifications by the two or more robust diverse classifier networks and the one or more diagnostic classifier networks, wherein in a lesser degree of agreements is indicative of an adversarial attack.

In various implementations, determining whether the input datum should be assigned to the classification category comprises: treating the two or more robust diverse networks as part of an ensemble, and applying an ensemble combining rule to outputs of the two or more robust diverse networks to determine whether the input datum should be assigned to the classification category.

In various implementations, the method further comprises computing a confidence score for the determination of whether the input datum should be assigned to the classification category based on at least the classifications by the two or more robust diverse networks for the input datum. Computing the confidence score can comprise computing the confidence sore with a confidence estimation machine learning system that is trained, through machine learning, to compute the confidence score for the determination of whether the input datum should be assigned to the classification category. The method may further comprise training, by the computer system, an additional robust diverse classifier network upon a determination that the confidence score is less than a specified value.

In various implementations, generating the first set of two or more robust diverse classifier networks comprises: training, through machine learning, a base robust classifier network to classify whether input data items should be assigned to the classification category, where the base robust classifier network is trained to be more robust to an adversarial attack than an initial classifier network that is trained to classify whether input data items should be assigned to the classification category; and selecting the two or more robust diverse classifier networks to be included in the first set, where the two or more robust diverse classifier networks are trained to be diverse from at least the base robust classifier network, and where the two or more robust diverse classifier networks are selected for inclusion in the first set based on a diversity criterion. Training the base robust classifier network can comprise training the base robust classifier network to be more robust to an adversarial attack that the initial classifier network by training the base robust classifier network to be less likely to make a misclassification error than the initial classifier network on an adversarial attack data item.

In various implementations, the classifier networks of the classifier further comprises the base robust classifier network. In that case, a classification by the base robust classifier for the input datum is additionally used to: determine whether the input datum is an adversarial attack; and determine whether the input datum should be assigned to the classification category.

In various implementations, the method further comprises selecting, by the computer system, the two or more robust diverse classifier networks to be included in the first set by, iteratively, for a number of n=1, . . . , N iterations, where N is greater than or equal to two, until a stopping criterion is met: training a nth classifier network to be diverse from the base robust classifier network; classifying, by each of the robust diverse classifier in the first set, if any, by the base robust classifier network, and by the nth classifier network, a nth training datum; computing input gradients for each of the robust diverse classifier networks in the first set, if any, for the base robust classifier network, and for the nth classifier network, for the nth training datum; computing a correlation between the input gradient for the nth classifier network for the nth training datum and the input gradient for the based robust classifier network, and computing correlations between the input gradient for the nth classifier network for the nth training datum and respectively the input gradients for each of the robust diverse classifier networks in the first set, if any, for the nth training datum; and adding the nth classifier network as a robust diverse classifier network to the first set upon a determination, based on the computed correlations, that the nth classifier network is sufficiently diverse from an applicable threshold number of the robust diverse classifier networks, if any, in the first set.

In various implementations, training the nth classifier network comprises training the nth classifier network to be diverse from the base robust classifier network by imposing an is-not-equal-to-node-to-node regularization link between the base robust classifier network and the nth classifier network.

In various implementations, the method further comprises determining whether the nth classifier network is sufficiently diverse from the threshold number of diverse classifier networks, if any, in the first set by determining whether at least a quantity of the computed correlations that is equal to or less than a threshold correlation value is equal to or greater than a threshold quantity.

In various implementations, the method further comprises, upon a determination that the nth classifier network is not sufficiently diverse from the applicable threshold number of the robust diverse classifier networks: training an additional nth classifier network to be diverse from the base robust classifier network: classifying, by the nth additional classifier network, the nth training datum; computing an input gradient for the additional nth classifier network, for the nth training datum; computing a correlation between the input gradient for the additional nth classifier network for the nth training datum and the input gradient for the based robust classifier network, and computing correlations between the input gradient for the additional nth classifier network for the nth training datum and respectively the input gradients for each of the robust diverse classifier networks in the first set, if any, for the nth training datum; and adding the additional nth classifier network as a robust diverse classifier network to the first set upon a determination, based on the computed correlations, that the additional nth classifier network is sufficiently diverse from the applicable threshold number of the robust diverse classifier networks, if any, in the first set.

In various implementations, the method further comprises, for each iteration where a robust diverse classifier network is added to the first set: updating a metric indicative of the likelihood that, for a non-training datum, at least one of the robust diverse classifier networks in the first set is sufficiently diverse from the base robust classifier network and/or the initial classifier network; and comparing the metric to the specified diversity likelihood value, wherein the stopping criteria is met if the metric is greater than the specified diversity likelihood value.

In various implementations, the method further comprises training the one or more diagnostic classifier networks of the second set.

In various implementations, training the one or more diagnostic classifier networks of the second set comprises, for each robust diverse network in the first set, training one or more corresponding diagnostic classifier networks, where each robust diverse network is more robust to adversarial attacks than the one or more corresponding diagnostic classifier networks.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer system comprising:
one or more processor cores; and
a memory that stores computer instructions that, when executed by the one or more processor cores, cause the one or more processor cores to implement a classifier that classifies whether input items should be assigned to a classification category and that is trained through machine learning, to be robust against adversarial attacks, wherein the classifier comprises a plurality of classifier networks, wherein each of the classifier networks comprises a neural network and wherein the plurality of classifier networks comprise:
a first set of two or more robust diverse classifier networks, wherein each of the two or more robust diverse classifier networks are trained through machine learning to classify whether input items should be assigned to the classification category, wherein the two or more robust diverse classifier networks are diverse in that errors by the two or more robust classifier networks are uncorrelated beyond a threshold, and wherein each of the two or more robust diverse classifiers is trained to be diverse from a base robust classifier network by imposing a regularization link between at least a first node in the base robust classifier network and a second node the robust diverse classifier, wherein the regularization link imposes a regularization loss that is determined based on a function that increases the regularization loss as a difference between activation values for the first and second nodes, for a data training item, decreases; and
a second set of one or more diagnostic classifier networks, wherein each of the one or more diagnostic classifier networks is trained through machine learning to classify whether input items should be assigned to the classification category, and wherein the one or more diagnostic classifier networks are less robust to adversarial attacks than the two or more robust diverse classifier networks in that the one or more diagnostic classifiers networks are more likely to make a misclassification error on an adversarial attack data item than the two or more robust diverse classifier networks,
wherein the memory stores instructions, that when executed by the one or more processor cores, cause the one or more processor cores to determine, in a deployment of the classifier, whether an input datum should be assigned to the classification category by: detecting, based on at least classifications by the two or more robust diverse networks and the one or more diagnostic classifier networks for the input datum, whether the input datum is an adversarial attack; and
determining, based on at least the classifications by the two or more robust diverse networks for the input datum and based on detection of whether the input datum is an adversarial attack, whether the input datum should be assigned to the classification category.

2. The computer system of claim 1, wherein the memory stores instructions, that when executed by the one or more processor cores, cause the one or more processor cores to implement an attack detection system that is trained, through machine learning, to detect whether the input datum is an adversarial attack.

3. The computer system of claim 2, wherein the memory stores instructions, that when executed by the one or more processor cores, cause the one or more processor cores to detect whether the input datum is an adversarial attack based on, at least, classifications by the one or more diagnostic classifier networks of the input datum.

4. The computer system of claim 3, wherein the memory stores instructions, that when executed by the one or more processor cores, cause the one or more processor cores to detect whether the input datum is an adversarial attack based on a degree of agreement between the classifications by the two or more robust diverse classifier networks and the one or more diagnostic classifier networks, wherein a lesser degree of agreements is indicative of an adversarial attack.

5. The computer system of claim 2, wherein the attack detection system comprises a neural network.

6. The computer system of claim 1, wherein the memory stores instructions, that when executed by the one or more processor cores, cause the one or more processor cores to determine whether the input datum should be assigned to the classification category by:
treating the two or more robust diverse networks as part of an ensemble; and
applying an ensemble combining rule to outputs of the two or more robust diverse networks to determine whether the input datum should be assigned to the classification category.

7. The computer system of claim 1, wherein the memory stores instructions, that when executed by the one or more processor cores, cause the one or more processor cores to compute a confidence score for the determination of whether the input datum should be assigned to the classification category based on at least the classifications by the two or more robust diverse networks for the input datum.

8. The computer system of claim 7, wherein the memory stores instructions, that when executed by the one or more processor cores, cause the one or more processor cores to implement a confidence estimation machine learning system that is trained, through machine learning, to compute the confidence score for the determination of whether the input datum should be assigned to the classification category.

9. The computer system of claim 8, wherein the memory stores instructions, that when executed by the one or more processor cores, cause the one or more processor cores to train an additional robust diverse classifier network upon a determination that the confidence score is less than a specified value.

10. The computer system of claim 1, wherein the memory stores instructions, that when executed by the one or more processor cores, cause the one or more processor cores to generate the first set of two or more robust diverse classifier networks by:
   training, through machine learning, the base robust classifier network to classify whether input data items should be assigned to the classification category, wherein the base robust classifier network is trained to be more robust to an adversarial attack than an initial classifier network that is trained to classify whether input data items should be assigned to the classification category; and
   selecting the two or more robust diverse classifier networks to be included in the first set, wherein the two or more robust diverse classifier networks are trained to be diverse from at least the base robust classifier network, and wherein the two or more robust diverse classifier networks are selected for inclusion in the first set based on a diversity criterion.

11. The computer system of claim 10, wherein the memory stores instructions, that when executed by the one or more processor cores, cause the one or more processor cores to train the base robust classifier network to be more robust to an adversarial attack than the initial classifier network by training the base robust classifier network to be less likely to make a misclassification error than the initial classifier network on an adversarial attack data item.

12. The computer system of claim 11, wherein the initial classifier network comprises an ensemble.

13. The computer system of claim 11, wherein:
   the classifier networks of the classifier further comprise the base robust classifier network; and
   a classification by the base robust classifier network for the input datum is additionally used to:
   determine whether the input datum is an adversarial attack; and
   determine whether the input datum should be assigned to the classification category.

14. The computer system of claim 10, wherein the memory stores instructions, that when executed by the one or more processor cores, cause the one or more processor cores to select the two or more robust diverse classifier networks to be included in the first set by, iteratively, for a number of n=1, ..., N iterations, where N is greater than or equal to two, until a stopping criterion is met:
   training a nth classifier network to be diverse from the base robust classifier network;
   classifying, by each of the robust diverse classifier in the first set, if any, by the base robust classifier network, and by the nth classifier network, a nth training datum;
   computing input gradients for each of the robust diverse classifier networks in the first set, if any, for the base robust classifier network, and for the nth classifier network, for the nth training datum;
   computing a correlation between the input gradient for the nth classifier network for the nth training datum and the input gradient for the based robust classifier network, and computing correlations between the input gradient for the nth classifier network for the nth training datum and respectively the input gradients for each of the robust diverse classifier networks in the first set, if any, for the nth training datum; and
   adding the nth classifier network as a robust diverse classifier network to the first set upon a determination, based on the computed correlations, that the nth classifier network is sufficiently diverse from an applicable threshold number of the robust diverse classifier networks, if any, in the first set.

15. The computer system of claim 14, wherein the memory stores instructions, that when executed by the one or more processor cores, cause the one or more processor cores to train the nth classifier network to be diverse from the base robust classifier network by imposing an is-not-equal-to-node-to-node regularization link between the base robust classifier network and the nth classifier network.

16. The computer system of claim 14, wherein the memory stores instructions, that when executed by the one or more processor cores, cause the one or more processor cores to determine whether the nth classifier network is sufficiently diverse from the threshold number of diverse classifier networks, if any, in the first set by determining whether at least a quantity of the computed correlations that is equal to or less than a threshold correlation value is equal to or greater than a threshold quantity.

17. The computer system of claim 16, wherein the memory stores instructions, that when executed by the one or more processor cores, cause the one or more processor cores to, upon a determination that the nth classifier network is not sufficiently diverse from the applicable threshold number of the robust diverse classifier networks:
   train an additional nth classifier network to be diverse from the base robust classifier network;
   classifying, by the nth additional classifier network, the nth training datum;
   computing an input gradient for the additional nth classifier network, for the nth training datum;
   computing a correlation between the input gradient for the additional nth classifier network for the nth training datum and the input gradient for the based robust classifier network, and computing correlations between the input gradient for the additional nth classifier network for the nth training datum and respectively the input gradients for each of the robust diverse classifier networks in the first set, if any, for the nth training datum; and
   adding the additional nth classifier network as a robust diverse classifier network to the first set upon a determination, based on the computed correlations, that the additional nth classifier network is sufficiently diverse from the applicable threshold number of the robust diverse classifier networks, if any, in the first set.

18. The computer system of claim 14, wherein the stopping criterion is a determination, by the computer system, that a likelihood that, for a non-training datum, at least one of the robust diverse classifier networks in the first set is sufficiently diverse from the base robust classifier network and/or the initial classifier network, is greater than a specified diversity likelihood value.

19. The computer system of claim 18, wherein the memory stores instructions, that when executed by the one or more processor cores, cause the one or more processor cores to, for each iteration where a robust diverse classifier network is added to the first set:
  update a metric indicative of the likelihood that, for a non-training datum, at least one of the robust diverse classifier networks in the first set is sufficiently diverse from the base robust classifier network and/or the initial classifier network; and
  compare the metric to the specified diversity likelihood value, wherein the stopping criterion is met if the metric is greater than the specified diversity likelihood value.

20. The computer system of claim 14, wherein the memory stores instructions, that when executed by the one or more processor cores, cause the one or more processor cores to train the one or more diagnostic classifier networks of the second set.

21. The computer system of claim 20, wherein the memory stores instructions, that when executed by the one or more processor cores, cause the one or more processor cores to train the one or more diagnostic classifier networks of the second set by, for each robust diverse network in the first set, train one or more corresponding diagnostic classifier networks, where each robust diverse network is more robust to adversarial attacks than the one or more corresponding diagnostic classifier networks.

22. A method comprising:
  training, with a computer system that comprises one or more processor cores and a memory that stores computer instructions executed by the one or more processor cores, through machine learning, a classifier that classifies whether input items should be assigned to a classification category and that is robust against adversarial attacks, wherein training the classifier comprises a plurality of classifier networks, wherein each of the classifier networks comprises a neural network, and wherein training the plurality of machine-learning classifiers comprises:
    training a first set of two or more robust diverse classifier networks, wherein each of the two or more robust diverse classifier networks are trained through machine learning to classify whether input items should be assigned to the classification category, wherein the two or more robust diverse classifier networks are diverse in that errors by the two or more robust classifier networks are uncorrelated beyond a threshold, and wherein each of the two or more robust diverse classifiers is trained to be diverse from a base robust classifier network by imposing a regularization link between at least a first node in the base robust classifier network and a second node the robust diverse classifier, wherein the regularization link imposes a regularization loss that is determined based on a function that increases the regularization loss as a difference between activation values for the first and second nodes, for a data training item, decreases; and
    training a second set of one or more diagnostic classifier networks, wherein each of the one or more diagnostic classifier networks is trained through machine learning to classify whether input items should be assigned to the classification category, and wherein the one or more diagnostic classifier networks are less robust to adversarial attacks than the two or more robust diverse classifier networks in that the one or more diagnostic classifiers networks are more likely to make a misclassification error on an adversarial attack data item than the two or more robust diverse classifier networks; and
  deploying, by the computer system, the classifier post-training to classify whether an input datum should be assigned to the classification category, wherein deploying the classifier comprises:
    detecting, based on at least classifications by the two or more robust diverse networks and the one or more diagnostic classifier networks for the input datum, whether the input datum is an adversarial attack; and
    determining, based on at least the classifications by the two or more robust diverse networks for the input datum and based on detection of whether the input datum is an adversarial attack, whether the input datum should be assigned to the classification category.

23. The method of claim 22, wherein:
  the method further comprises training, by the computer system, through machine learning, an attack detection system to detect whether the input datum is an adversarial attack; and
  deploying the classifier further comprises detecting, by the attack detection system, whether the input datum is an adversarial attack.

24. The method of claim 23, wherein detecting whether the input datum is an adversarial attack comprises detecting, by the attack detection system, whether the input datum is an adversarial attack based on, at least, classifications by the one or more diagnostic classifier networks of the input datum.

25. The method of claim 24, wherein detecting whether the input datum is an adversarial attack comprises detecting, by the attack detection system, whether the input datum is an adversarial attack based on a degree of agreement between the classifications by the two or more robust diverse classifier networks and the one or more diagnostic classifier networks, wherein a lesser degree of agreements is indicative of an adversarial attack.

26. The method of claim 22, wherein determining whether the input datum should be assigned to the classification category comprises:
  treating the two or more robust diverse networks as part of an ensemble; and
  applying an ensemble combining rule to outputs of the two or more robust diverse networks to determine whether the input datum should be assigned to the classification category.

27. The method of claim 22, further comprising computing a confidence score for the determination of whether the input datum should be assigned to the classification category based on at least the classifications by the two or more robust diverse networks for the input datum.

28. The method of claim 27, wherein computing the confidence score comprises computing the confidence sore with a confidence estimation machine learning system that is trained, through machine learning, to compute the confidence score for the determination of whether the input datum should be assigned to the classification category.

29. The method of claim 28, further comprising training, by the computer system, an additional robust diverse classifier network upon a determination that the confidence score is less than a specified value.

30. The method of claim 22, wherein generating the first set of two or more robust diverse classifier networks comprises:
  training, through machine learning, the base robust classifier network to classify whether input data items should be assigned to the classification category, wherein the base robust classifier network is trained to be more robust to an adversarial attack than an initial classifier network that is trained to classify whether input data items should be assigned to the classification category; and selecting the two or more robust diverse classifier networks to be included in the first set, wherein the two or more robust diverse classifier networks are trained to be diverse from at least the base robust classifier network, and wherein the two or more robust diverse classifier networks are selected for inclusion in the first set based on a diversity criterion.

31. The method of claim 30, wherein training the base robust classifier network comprises training the base robust classifier network to be more robust to an adversarial attack than the initial classifier network by training the base robust classifier network to be less likely to make a misclassification error than the initial classifier network on an adversarial attack data item.

32. The method of claim 31, wherein:
the classifier networks of the classifier further comprise the base robust classifier network; and
a classification by the base robust classifier network for the input datum is additionally used to:
determine whether the input datum is an adversarial attack; and
determine whether the input datum should be assigned to the classification category.

33. The method of claim 30, further comprising selecting, by the computer system, the two or more robust diverse classifier networks to be included in the first set by, iteratively, for a number of n=1, . . . ,N iterations, where N is greater than or equal to two, until a stopping criterion is met:
training a nth classifier network to be diverse from the base robust classifier network;
classifying, by each of the robust diverse classifier in the first set, if any, by the base robust classifier network, and by the nth classifier network, a nth training datum;
computing input gradients for each of the robust diverse classifier networks in the first set, if any, for the base robust classifier network, and for the nth classifier network, for the nth training datum;
computing a correlation between the input gradient for the nth classifier network for the nth training datum and the input gradient for the based robust classifier network, and computing correlations between the input gradient for the nth classifier network for the nth training datum and respectively the input gradients for each of the robust diverse classifier networks in the first set, if any, for the nth training datum; and
adding the nth classifier network as a robust diverse classifier network to the first set upon a determination, based on the computed correlations, that the nth classifier network is sufficiently diverse from an applicable threshold number of the robust diverse classifier networks, if any, in the first set.

34. The method of claim 33, wherein training the nth classifier network comprises training the nth classifier network to be diverse from the base robust classifier network by imposing an is-not-equal-to-node-to-node regularization link between the base robust classifier network and the nth classifier network.

35. The method of claim 33, further comprising determining whether the nth classifier network is sufficiently diverse from the threshold number of diverse classifier networks, if any, in the first set by determining whether at least a quantity of the computed correlations that is equal to or less than a threshold correlation value is equal to or greater than a threshold quantity.

36. The method of claim 35, further comprising, upon a determination that the nth classifier network is not sufficiently diverse from the applicable threshold number of the robust diverse classifier networks:
training an additional nth classifier network to be diverse from the base robust classifier network;
classifying, by the nth additional classifier network, the nth training datum;
computing an input gradient for the additional nth classifier network, for the nth training datum;
computing a correlation between the input gradient for the additional nth classifier network for the nth training datum and the input gradient for the based robust classifier network, and computing correlations between the input gradient for the additional nth classifier network for the nth training datum and respectively the input gradients for each of the robust diverse classifier networks in the first set, if any, for the nth training datum; and
adding the additional nth classifier network as a robust diverse classifier network to the first set upon a determination, based on the computed correlations, that the additional nth classifier network is sufficiently diverse from the applicable threshold number of the robust diverse classifier networks, if any, in the first set.

37. The method of claim 33, wherein the stopping criterion is a determination, by the computer system, that a likelihood that, for a non-training datum, at least one of the robust diverse classifier networks in the first set is sufficiently diverse from the base robust classifier network and/or the initial classifier network, is greater than a specified diversity likelihood value.

38. The method of claim 37, further comprising, for each iteration where a robust diverse classifier network is added to the first set:
updating a metric indicative of the likelihood that, for a non-training datum, at least one of the robust diverse classifier networks in the first set is sufficiently diverse from the base robust classifier network and/or the initial classifier network; and
comparing the metric to the specified diversity likelihood value, wherein the stopping criterion criteria is met if the metric is greater than the specified diversity likelihood value.

39. The method of claim 33, further comprising training the one or more diagnostic classifier networks of the second set.

40. The method of claim 39, wherein training the one or more diagnostic classifier networks of the second set comprises, for each robust diverse network in the first set, training one or more corresponding diagnostic classifier networks, where each robust diverse network is more robust to adversarial attacks than the one or more corresponding diagnostic classifier networks.

* * * * *